(12) United States Patent
Juravicius et al.

(10) Patent No.: US 11,461,588 B1
(45) Date of Patent: Oct. 4, 2022

(54) ADVANCED DATA COLLECTION BLOCK IDENTIFICATION

(71) Applicant: METACLUSTER LT, UAB, Vilnius (LT)

(72) Inventors: Martynas Juravicius, Vilnius (LT); Andrius Kuksta, Vilnius (LT)

(73) Assignee: METACLUSTER LT, UAB, Vilnius (LT)

( * ) Notice: Subject to any disclaimer, the term of this patent is extended or adjusted under 35 U.S.C. 154(b) by 0 days.

(21) Appl. No.: 17/217,869

(22) Filed: Mar. 30, 2021

(51) Int. Cl.
| | |
|---|---|
| *G06K 9/62* | (2022.01) |
| *G06N 5/02* | (2006.01) |
| *G06N 3/04* | (2006.01) |
| *G06N 20/00* | (2019.01) |
| *G06F 16/951* | (2019.01) |
| *G06F 21/57* | (2013.01) |
| *H04L 9/40* | (2022.01) |
| *H04L 67/02* | (2022.01) |

(52) U.S. Cl.
CPC ......... *G06K 9/6256* (2013.01); *G06K 9/6269* (2013.01); *G06K 9/6278* (2013.01); *G06K 9/6282* (2013.01); *G06N 3/0445* (2013.01); *G06N 5/025* (2013.01); *G06N 20/00* (2019.01); *G06F 16/951* (2019.01); *G06F 21/577* (2013.01); *G06F 2216/03* (2013.01); *H04L 63/1433* (2013.01); *H04L 67/02* (2013.01)

(58) Field of Classification Search
CPC .. G06K 9/6256; G06K 9/6269; G06K 9/6278; G06K 9/6282; G06N 20/00; G06N 3/0445; G06N 5/025; G06F 16/951; G06F 21/577; G06F 2216/03; H04L 63/1433; H04L 67/02

USPC .......................................................... 707/776
See application file for complete search history.

(56) References Cited

U.S. PATENT DOCUMENTS

| | | | | |
|---|---|---|---|---|
| 8,434,154 | B1 * | 4/2013 | Smith | G06F 21/10 726/26 |
| 9,680,866 | B2 | 6/2017 | Baddour et al. | |
| 10,572,778 | B1 * | 2/2020 | Robinson | H04L 67/22 |
| 2009/0034851 | A1 | 2/2009 | Fan et al. | |
| 2014/0136541 | A1 * | 5/2014 | Farahat | G06F 16/958 707/740 |
| 2018/0097762 | A1 * | 4/2018 | Garcia | H04L 67/18 |
| 2018/0218627 | A1 * | 8/2018 | Smith Lewis | G09B 7/04 |
| 2018/0308019 | A1 * | 10/2018 | Bansal | G06N 5/025 |

(Continued)

OTHER PUBLICATIONS

PCT Notification of Transmittal of the International Search Report and the Written Opinion of the International Searching Authority, or the Declaration, PCT/ISA/220, PCT/IB2022/050747, dated Apr. 29, 2022, 28 Pages.

*Primary Examiner* — Hosain T Alam
*Assistant Examiner* — Nicholas E Allen
(74) *Attorney, Agent, or Firm* — FisherBroyles, LLP; Keats Quinalty

(57) ABSTRACT

Systems and methods that allow examination of response data collected from content providers and provide for classification and routing according to the classification. The process of classification employs an unsupervised, or partially unsupervised, Machine Learning classifier model for identifying data collection responses that contains no data, mangled data, or a block, for assigning a classification correspondingly and for feeding the classification decision back to a data collection platform.

15 Claims, 9 Drawing Sheets

(56) References Cited

U.S. PATENT DOCUMENTS

| | | | |
|---|---|---|---|
| 2020/0074300 A1* | 3/2020 | Newman | G06N 3/0454 |
| 2020/0193153 A1* | 6/2020 | Lee | G06F 40/226 |
| 2020/0293586 A1* | 9/2020 | Singhal | G06F 16/908 |
| 2020/0310599 A1* | 10/2020 | Mukherjee | G06F 9/451 |
| 2020/0356618 A1 | 11/2020 | Shribman et al. | |
| 2020/0358858 A1 | 11/2020 | Shribman et al. | |
| 2020/0380171 A1* | 12/2020 | Bonat | G06F 16/957 |
| 2020/0389495 A1* | 12/2020 | Crabtree | H04L 63/1441 |
| 2021/0026835 A1* | 1/2021 | Pai | G06F 16/215 |
| 2021/0042767 A1* | 2/2021 | Guan | G06Q 30/0255 |
| 2021/0065091 A1* | 3/2021 | Bhattacharyya | G06Q 10/063112 |
| 2021/0084077 A1* | 3/2021 | Brannon | G06F 21/6245 |

* cited by examiner

ADVANCED DATA COLLECTION BLOCK IDENTIFICATION

FIELD

The methods and systems detailed herein relate to processing response data in the context of a scraping service, wherein the processing employs a trained Machine Learning classification model.

BACKGROUND

Web scraping (also known as screen scraping, data mining, web harvesting) in its most general sense is the automated gathering of data from the internet. More technically, it is the practice of gathering data from the internet through any means other than a human using a web browser or a program interacting with an application programming interface (API). Web scraping is usually accomplished by executing a program that queries a web server and requests data automatically, then parses the data to extract the requested information.

Web scrapers—programs written for web scraping—can have a significant advantage over other means of accessing information, like web browsers. The latter are designed to present information in a readable way for humans, whereas web scrapers are excellent at collecting and processing large amounts of data quickly. Rather than opening one page at a time through a monitor (as web browsers do), web scrapers are able to collect, process, aggregate and present large databases of thousands or even millions of pages at once.

Sometimes a website allows another automated way to transfer its structured data from one program to another via an API. Typically, a program will make a request to an API via Hypertext Transfer Protocol (HTTP) for some type of data, and the API will return this data from the website in a structured form. It serves as a medium to transfer the data. However, using APIs is not considered web scraping since the API is offered by the website (or a third party) and it removes the need for web scrapers.

An API can transfer well-formatted data from one program to another and the process of using it is easier than building a web scraper to get the same data. However, APIs are not always available for the needed data. Also, APIs often use volume and rate restrictions and limit the types and the format of the data. Thus, a user would use web scraping for the data for which an API does not exist or which is restricted in any way by the API.

Usually, web scraping includes the following steps: retrieving Hypertext Markup Language (HTML) data from a website; parsing the data for target information; saving target information; repeating the process if needed on another page. A web scraper is a program that is designed to do all of these steps. A related program—a web crawler (also known as a web spider)—is a program or an automated script which performs the first task, i.e., it navigates the web in an automated manner to retrieve raw HTML data of the accessed web sites (the process also known as indexing).

Scraping activity may be performed by multiple types of scraping applications that can be generally categorized, for example, as browser, headless browser, command line tools, programming language library, etc.

Browser—an application executed within a computing device, usually in the context of an end-user session, with the functionality sufficient to accept the user's request, pass it to the Target Web server, process the response from the Web server, and present the result to the user. Browser is considered a user-side scripting enabled tool, e.g., capable of executing and interpreting JavaScript code.

Headless browser—a web browser without a graphical user interface (GUI). Headless browsers provide automated control of a web page in an environment similar to popular web browsers but are executed via a command-line interface or using network communication. They are particularly useful for testing web pages as they are able to render and understand HTML the same way a browser would, including styling elements such as page layout, color, font selection and execution of JavaScript and AJAX which are usually not available when using other testing methods. Two major use cases can be identified:
- scripted web page tests—with the purpose of identifying bugs, whereas a close resemblance to a user activity is necessary.
- web scraping—where resemblance to a user activity is mandatory to avoid blocking. i.e. the request should possess all the attributes of an organic Web browsing request.

Headless browser is considered a user-side scripting enabled tool, e.g., capable of executing and interpreting JavaScript code.

Command line tools—GUI-less applications that allow to generate and submit a Web request through a command line terminal e.g. CURL. Some tools in this category may have a GUI wrapped on top, but the graphical elements would not cover displaying the result of the HTTP request. Command line tools are limited in their functionality in that they are not capable of executing and interpreting JavaScript code.

Programming language library—a collection of implementations of behavior, written in terms of a language, that has a well-defined interface by which the behavior is invoked. For instance, when particular HTTP methods are to be invoked for executing scraping requests, the scraping application can use a library containing the methods to make system calls instead of implementing those system calls over and over again within the program code. In addition, the behavior is provided for reuse by multiple independent programs, where the program invokes the library-provided behavior via a mechanism of the language. Therefore, the value of a library lies in the reuse of the behavior. When a program invokes a library, it gains the behavior implemented inside that library without having to implement that behavior itself. Libraries encourage the sharing of code in a modular fashion, and ease the distribution of the code. Programming language libraries are limited in their functionality in that they are not capable of executing and interpreting JavaScript code, unless there is another tool capable of user-side scripting, for which the library is a wrapper.

Combinations of the previous basic agent types, to a varying degree, implement HTTP protocol methods and client-side scripting.

The response obtained from the web server generally includes the following parts:
- HTTP metadata, containing HTTP headers, cookies and HTTP response code.
- the main HTML document
- additional files needed to process and render the finalized version of the web page: images, Cascading Style Sheet (CSS) files and JavaScript (JS) scripts.

The scraping application types listed above vary in the technical capabilities they possess, often due to the very purpose the application has been developed for. While sending the initial request to the target Web server, all of the listed types of scraping applications pass the parameters mandatory for submitting and processing a web request. e.g., HTTP parameters—headers, cookies, declare the version of HTTP protocol they support and intend to communicate in, with Transmission Control Protocol (TCP) parameters disclosed while initiating the TCP session underlying the HTTP request (e.g. TCP Windows size and others). As described above, browsers and headless browsers can process the JavaScript files obtained within the web server's response e.g., submit configuration settings through JavaScript when requested, while command line utilities are incapable of doing that.

While processing the web server's response, all of the listed types of scraping applications are capable of obtaining, interpreting, rendering or otherwise processing, and presenting the HTTP metadata and the main HTML document, whereas some of the listed scraping applications do not possess the functionality of processing the additional files obtained from the web target's response e.g., executing scripted code client side. Therefore, a practical classification of web harvesting tools is based on their ability to execute and interpret JavaScript code.

While performing the scraping tasks the agent is subject to the same context of user's data collection and rigorous analysis by the Web servers as a regular private Web surfer. Web tracking is the practice by which websites and third-party companies collect information about users' online activity. The basis of tracking is the accurate identification of users—the user is detected and identified even when the user is passing through a random website that the user is not signed into. The conventional solution to implement identification and tracking is saving web cookies to the user's browser. Apart from tracking, users cookies help with HTTP session management and personalization of the web content presented by Web servers.

The scraping user identification and tracking methodology may comprise more traditional tracking methods such as by using IP addresses or the more advanced and complex method of fingerprinting. The latter method is a more advanced technique developed to combat the inefficiencies of the traditional options and will be examined in further details separately in a section below. The former usually involves tracking and analyzing the IP address of the last-mile proxies used for servicing the request. A proxy server acts as an intermediary for requests from the user seeking resources from target servers. A user connects to the proxy server, requesting data. The proxy server evaluates the request and forwards the request to the actual target system or systems containing the corresponding data. After obtaining the data, the proxy server normally forwards the data to the original requestor, but other actions can also be performed by the proxy (e.g., return error message, etc.). Depending on the type of request, a proxy server may or may not have full visibility into the actual content fetched to the original requestor, e.g., in case of an encrypted Hypertext Transfer Protocol Secure (HTTPS) session, the proxy may serve as an intermediary, blindly forwarding the data without being aware of what is being forwarded.

The proxies can be divided into different types depending on what functions are provided or what servers are used. The proxies can also be divided into Residential Internet Protocol (IP) proxies, Datacenter IP proxies, and Mobile IP proxies. A Residential IP address is an address from the range specifically designated by the owning party as assigned to private customers. Usually a Residential proxy is an IP address linked to a physical device, for example, mobile phone or desktop computer, however businesswise the blocks of Residential IP addresses may be bought from the owning Proxy Service Provider by another company directly, in bulk. The real owners of the Residential IP address ranges, namely Internet service providers (ISPs), register residential IP addresses in public databases, which allows websites to determine a device's internet provider, network, and location. Datacenter IP proxy is the proxy server assigned with a datacenter IP. Datacenter IPs are IPs owned by companies, not by individuals. The datacenter proxies are actually IP addresses that are not located in a natural person's home. Instead, the datacenter proxies are associated with a secondary corporation. Mobile IP proxies may be considered a subset of the Residential proxy category. A mobile IP proxy is essentially one IP address that is obtained from mobile operators. Mobile IP proxies use mobile data, as opposed to a residential proxy that uses broadband ISPs or home Wi-Fi. When a user sends a request, the request goes to the proxy server first. The proxy server then makes the request on the user's behalf, collects the response from the web server, and forwards the web page data so that the user can access the page. When the proxy server forwards the requests, it can make changes to the data but yet provide the data requested. A proxy server changes the user's IP address, so the web server is not provided with the geographical location of the user. A proxy can encrypt the user's data so that the user's data becomes unreadable in transit. Also, a proxy server can block access to certain web pages, based on IP address, domain name, or the communication protocol parameters, such as the port requested.

Exit node proxies, or simply exit nodes, are gateways where the traffic hits the Internet. There can be several proxies used to perform a user's request, but the exit node proxy is the final proxy that contacts the target and forwards the information from the target to the user. There can be several proxies serving the user's request, forming a proxy chain, passing the request through each proxy, with the exit node being the last link in the chain that ultimately passes the request to the target.

A significant aspect of web users tracking methodology is registering a visitor's IP address and linking the user's logged web activity with said IP address. The registered IP address of the web user can also become an attribute taken into consideration and utilized by the web sites practicing fingerprinting the visiting users. While technically a reliable parameter, tracking or fingerprinting by IP address becomes less relevant for identifying a user and applying a personalized content policy due to the relaxed IP address utilization practices, e.g., a single web surfer using multiple IP addresses across multiple devices, IP address hopping while changing locations and providers, as well as utilizing proxy servers as described above.

Another significant factor of enriching the browsing profile and mitigating the stateless nature of HTTP protocol is the notion of an HTTP cookie. An HTTP cookie (also called web cookie, Internet cookie, browser cookie, or simply cookie) is an arbitrary piece of data, usually chosen and first sent by the web server, and stored on the client computer by the web browser. The browser then sends the cookie back to the server with every request, introducing states (memory of previous events) into otherwise stateless HTTP transactions. Without cookies, each retrieval of a web page or component of a web page would be an isolated event, largely unrelated to all other page views made by the user on the website. Thus, cookies were designed to be a reliable mechanism for websites to remember stateful information (such as items added in the shopping cart in an online store) or to record the user's browsing activity (including clicking particular buttons, logging in, or recording which pages were visited in the past). They can also be used to remember pieces of information that the user previously entered into form fields, such as names, addresses, passwords, and payment card numbers.

Cookies perform essential functions in the modern web. Perhaps most importantly, authentication cookies are the most common method used by web servers to know whether the user is logged in or not, and which account they are logged in with. Without such a mechanism, the site would not know whether to send a page containing sensitive information, or require the user to authenticate themselves by logging in.

Tracking cookies, and especially third-party tracking cookies, are commonly used as ways to track users' web browsing habits by collecting individual cookies and compiling long-term records of individuals' browsing histories. This can also be done to some extent by using the IP address of the computer requesting the page or the referrer field of the HTTP request header, but cookies allow for greater precision.

If the user requests a page of the site, but the request contains no cookie, the server presumes that this is the first page visited by the user. So, the server creates a unique identifier (typically a string of random letters and numbers) and sends it as a cookie back to the browser together with the requested page.

From this point on, the cookie will automatically be sent by the browser to the server every time a new page from the site is requested. The server not only sends the page as usual but also stores the URL of the requested page, the date/time of the request, and the cookie in a log file. By analyzing this log file, it is then possible to find out which pages the user has visited, in what sequence, and for how long.

A relevant factor in web cookie processing is the fact that nowadays a large portion of web users is much more privacy oriented and conscious about accepting cookies. One of the consequences is that deleting cookies, or restricting, at the web visitor's end, what is accepted Web platforms' behavior, is realistically expected from some visitors. Therefore cookies, as well as IP tracking, through still considered a baseline and widely used approaches, benefit greatly from combining them with other methods of tracking users and their behavior e.g. fingerprinting.

In light of the current public preferences in web browsing behavior and generally accepted privacy expectations, it is no wonder that the traditional methods of tracking web surfers are less efficient. When compared with categorizing web visitors by their IP address, or the IP address of the proxy server used for reaching the Web server, or trying to uniquely identify and categorize a user by analyzing the cookies revealed by the user's browser, fingerprinting, as a relatively newer method of web users' profiling, comprises more sophisticated techniques for uniquely identifying the requesting user and dynamically adapting the Web server's response according to the guidelines for that particular visitor or a category of visitors.

Companies with a web presence often develop a selective stance toward scraping parties, with reasons varying from the increase in capacity utilization to the effect data scraping may have on the business model of the data owner. There are techniques that websites use to react to scraping activities during the crawling stage, i.e., the stage of obtaining the data from the source by the scraping application initiating a connection with the web site and submitting the prepared request for a web page.

For example, a web site may try to identify the party submitting the request by a parameter that is part of the request, compare the identifying information obtained with the pre-defined list of guidelines for users or categories of users, and act upon the request accordingly, e.g., allow it through, block it to prevent further access, register the requesting party in an internal database, create a fingerprint for the requesting party and register it in a corresponding database, share the resultant information with other parties, or any combination thereof.

Another method of recognizing the behavior of interest may involve observing the rate of actions (or actions over time) registered from a particular IP address, since humans normally perform less actions than an automatized toolset would. Adapting to the customized policies web scrapers often choose to employ proxies and perform web scraping through multiple proxy IP addresses, thus masking the real IP address of the web scraper. This method both increases the speed of scraping and helps avoid impediments due to a single block-listed IP address since the scraping activity would be distributed across the IP addresses of multiple proxy servers.

Employing multiple methods of identifying the requesting users and acting upon the request according to internal guidelines, web sites may choose to completely block the request which results in the desired data not being obtained. The web site may choose to widen the scope of the reaction and block the IP address of the requesting party, or to have the range of IP addresses, possibly the subnet the requestor's IP address belongs to, blocked fully or partially.

Another policy applied to allegedly scraping parties may be to partially or temporarily reduce the visibility of the content to hinder further automatized scraping. As a variant, the data presented to an alleged scraping party may be pre-processed, or filtered, and presented in a way that makes it useless or reduces its value.

Therefore the data collection platforms identify clearly and unambiguously the responses that instead of requested data contain a blocking or a mangled response from the content platform.

SUMMARY

For web scraping to mitigate negative policy factors, to collect public data successfully, and to effectively identify the blocked content prior to submitting it to the requesting party, the scraping applications need to employ methods of adapting to the challenges. One exemplary method that ensures the blocked content is identified during the scraping and is processed accordingly is the advanced blocked content identification based on Machine Learning Classifier model employed for examining the responses received from Target platforms, identifying responses with the content absent, blocked or mangled, and providing feedback to the scraping platform in order to prevent mangled content reaching the requesting parties. The input for classification may be obtained by stripping the HTTP response of the metadata down to the actual HTML content. However, in some embodiments, the non-HTML part of the response may be part of the classification input.

The classification output may inform the decision if the request should be retried, however it generally does not contain input for deciding in what manner the request should be retried. The methods, among other benefits, may increase the probability of positive content reaching the requesting customer and blocked content not being transmitted but instead being processed at the scraping platform.

In one aspect, the embodiments detailed here disclose methods and systems of examining the content returned by content providers by processing textual elements extracted from a HTML page contained within a response from a Web server, identifying the quality of the content, assigning a classification correspondingly, and feeding the classification decision back to the scraping platform, with the response processing based on a trained Machine Learning classification model.

BRIEF DESCRIPTION OF DRAWINGS

The features and advantages of the example embodiments described herein will become apparent to those skilled in the art to which this disclosure relates upon reading the following description, with reference to the accompanying drawings.

DETAILED DESCRIPTION

Figure 1:
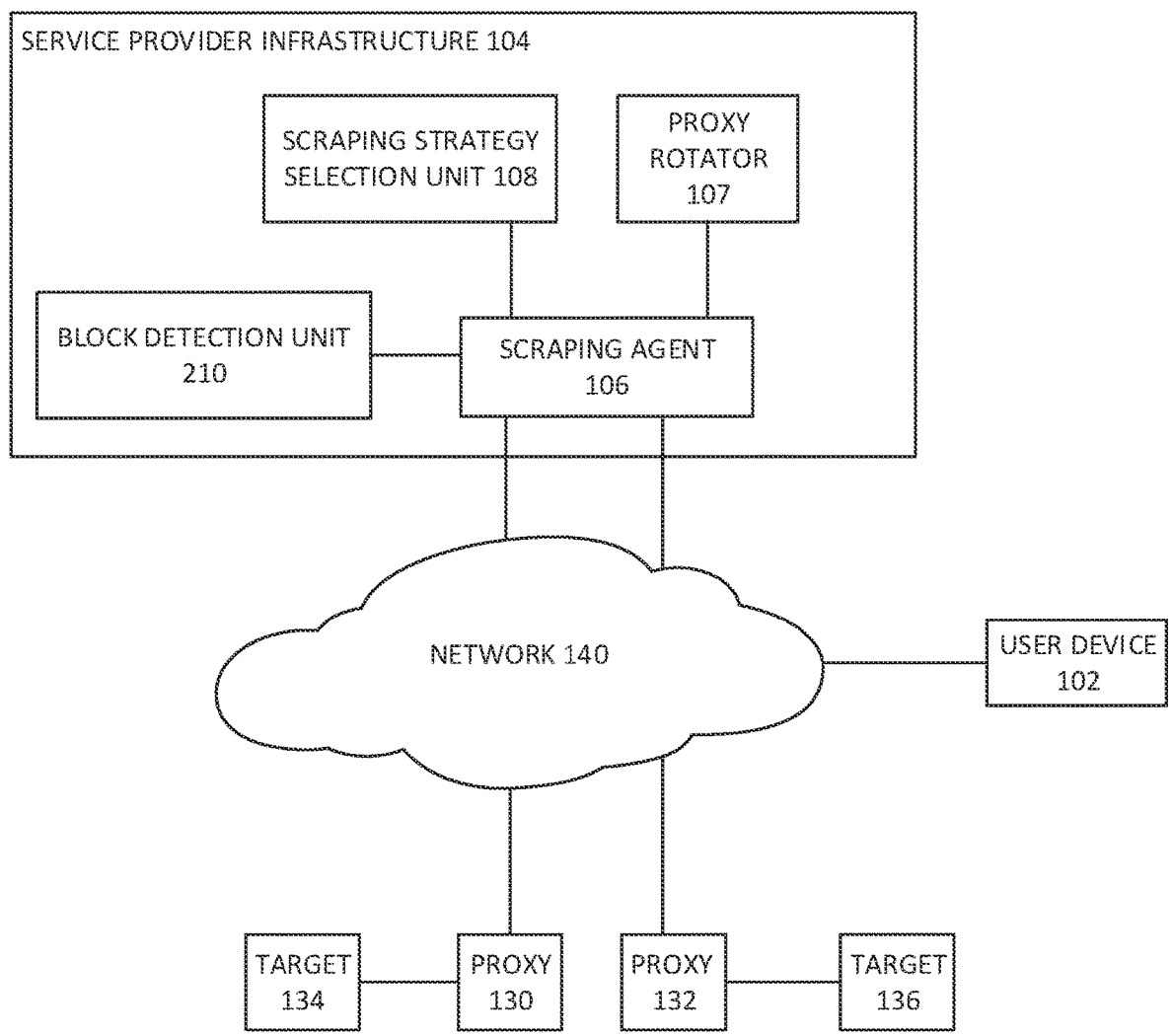
FIG. 1 is an exemplary component diagram that shows the overall architecture of components and context of at least one aspect of solution functions.

Some general terminology descriptions may be helpful and are included herein for convenience and are intended to be interpreted in the broadest possible interpretation. Elements that are not imperatively defined in the description should have the meaning as would be understood by a person skilled in the art. Elements 104, 106, 107, 108, 210 identify parts of the Service Provider Infrastructure, with elements 102, 130, 132, 134, 136, and 140 showing external components or systems.

User Device 102 can be any suitable user computing device including, but not limited to, a smartphone, a tablet computing device, a personal computing device, a laptop computing device, a gaming device, a vehicle infotainment device, a smart appliance (e.g., smart refrigerator or smart television), a cloud server, a mainframe, a notebook, a desktop, a workstation, a mobile device, or any other electronic device used for making a scraping request.

Service Provider Infrastructure 104 (SPI 104) is the combination of the elements comprising the platform that provides for the service of collecting data from the Internet by executing data collection requests submitted by customers in an efficient manner.

Scraping Agent 106 is a component of the Service Provider Infrastructure 104 that, among other things, is responsible for containing and running the scraping applications executing scraping requests originating from the commercial users, as well as accepting said requests from users. One role of this element is to perform data collection operations according to the requests submitted to it. Upon obtaining response data from the Target system, or systems, Scraping Agent 106 either returns the data to the requesting party or, upon identifying a discrepancy in the response, performs additional data collection activities.

One aspect of the functionality contained within Scraping Agent 106 is the selection of an appropriate strategy for a data collection request, wherein selection may contain requesting a scraping strategy from an external platform such as Scraping Strategy Selection Unit 108 (SSSU 108), and wherein a strategy may comprise, though is not limited to: setting values for the request parameters, choosing a scraping agent application for executing a request against a particular target, or a category of targets, and selecting a proxy server aligned with the parameters and requirements of a data collection request. In an exemplary embodiment the decision to employ a particular scraping agent application for a request may be based on the checking the URL of the request, i.e., the hostname or the domain of the target contained therein, against a pre-defined ruleset, matching a particular host, or a domain, with scraping software best aligned with the policies and capabilities of the target.

Another aspect of Scraping Agent 106 functionality is to select a proxy for executing the request, locally or from a dedicated proxy management platform such as Proxy Rotator 107, whereas the parameters of the proxy server selected are aligned with the requirements of the request, e.g., the geolocation of the proxy may have to coincide with the requested Target's location.

In an alternative embodiment, Scraping Agent 106 may be a third party component not located within the Service Provider Infrastructure 104 but communicably connected to the Block Detection Unit 210 (BDU 210).

Yet another aspect of Scraping Agent 106 functionality is, upon obtaining the response from the Target, to evaluate the quality of the data contained therein and to process said data accordingly, either forwarding the data to the requesting user or submitting the request to the repeated process of execution against the Target. The prerequisite steps may first be to examine the responses in order to filter out the obvious technical errors (e.g., HTTP response codes 4xx or 5xx identified within the response) or to check the responses against a static list of custom rules describing the conditions under which the response is clearly identified as a blocked or a mangled response that should not be subjected to further block identification processing. Additionally, some of the static rules within the list of static rules may be devised by customers, introducing a custom reaction to a standard HTTP response code, e.g., a customer may request that HTTP response code 503 be considered a successful response and should not be subjected to further processing, including Machine Learning-based classification.

In some embodiments the static ruleset may comprise at least one of the following:
html status codes
text values in http headers, cookies or html;
html elements in html;
with any of the listed elements potentially identifying a blocked response.
Static ruleset is used by the scraping agent against the response before submitting the response to Block Detection Unit 210 for classification so that at least a portion of clearly identified blocked responses can be filtered out without introducing unnecessary processing load within BDU 210. As en exemplary flow of the response evaluation the following process may take place:

if a response passes static ruleset successfully, the response is sent to BDU 210;

if a response fails against static ruleset, the response is submitted for a retry;

As stated previously the requesting device is able to additionally, even though temporary within the context of its own request, add some rules to the static ruleset by submitting the additional rules within the parameters of the request.

The actual Machine Learning-based classification model may be one of the following—Bag of words, Naïve Bayes algorithm, Support vector machines, Logistic Regression, Random Forest classifier, Xtreme Gradient Boosting Model, Convolutional Neural Network, or Recurrent Neural Network.

The processing of the data upon the analysis may comprise extracting the actual HTML content from the response data obtained from a target Web server, or ignoring the metadata within said response, e.g., HTTP headers and cookies.

Proxy Rotator 107—is a part of the Service Provider Infrastructure 104 coupled with separate external components implementing specific assisting functionalities and is responsible for proxy control, rotation, maintenance, collecting statistical data, and reporting.

Scraping Strategy Selection Unit 108 (SSSU 108) is the component responsible for storing, identifying, and assigning a particular set of parameters defining the context of a scraping request or session. A defined set of parameters optimized for a particular type of request or target is called a Scraping strategy. A singular Scraping strategy is selected and provided by SSSU 108 to Scraping Agent 106 based on the parameters of the request, extracted by Scraping Agent 106. One aspect of the functionality contained within SSSU 108 is the selection of an appropriate strategy for a data collection request and provisioning the strategy selected to a Scraping Agent 106, wherein a strategy may comprise, though is not limited to: setting values for the request parameters, choosing a scraping agent application for executing a request against a particular target, or a category of targets, and selecting a proxy server aligned with the parameters and requirements of a data collection request. In an exemplary embodiment the decision to employ a particular scraping agent application for a request may be based on the checking the URL of the request, i.e., the hostname or the domain of the target contained therein, against a pre-defined ruleset, matching a particular host, or a domain, with scraping software best aligned with the policies and capabilities of the target.

Proxy 130 and 132 indicate an exemplary multitude of proxy servers (computer systems or applications) open for client connections, that act as an intermediary for requests from clients seeking resources from other servers. A client connects to the proxy server, requesting a service, such as a file, a connection, a web page, or other resources available from a different server. The proxy server evaluates the request for content and forwards the request to the target resource, or resources, containing the content. After obtaining the content, the proxy server normally forwards the content to the original requestor, but other actions by the proxy (for example, return error message) can also be performed. In one aspect, in at least one of the embodiments detailed herein, a proxy server may not have full visibility into the actual content fetched for the original requestor, e.g., in case of an encrypted HTTPS session, if the proxy is not the decrypting end-point, the proxy serves as an intermediary blindly forwarding the data without being aware of what is being forwarded. However, the metadata of the response is always visible to the Service Provider, e.g. HTTP headers. This functionality is necessary for the proxy to correctly forward the data obtained to the correct requesting party—the end user or the mediating proxy device. Proxy 130 and Proxy 132 are presented here as a simple indication that there can be more than one proxy server held at the Service Provider Infrastructure 104 or be available externally to be employed for performing the data collection operations. The embodiments should not be limited to the proxies that belong to the Service Provider. The proxies can be owned and managed by a third party; however it is assumed that the Service Provider Infrastructure 104 has access and can use such proxies for servicing the scraping requests.

Target 134 and 136 indicate an exemplary multitude of web servers serving content accessible through HTTP/HTTPS protocols. Target 134 and Target 136 are presented here as a simple indication that there can be more than one target, but it should not be understood in any way as limiting the scope of the disclosure. There can be an unlimited number of Targets in the Network.

Network 140 is a digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Extranet, Internetwork, Internet.

The plurality of exemplary methods used to construct, train, and utilize the Block detection model for classification of response data comprise the system depicted in FIG. 1, which shows an exemplary component diagram of the overall architecture of the disclosed components and context of at least one aspect of solution functions. In at least one aspect, the present embodiments show communications between the User Device 102 and the Service Provider Infrastructure 104 to reach any Target 134, 136 on the Network 140. The Service Provider Infrastructure 104 comprises Scraping Agent 106, Proxy Rotator 107, Scraping Strategy Selection Unit 108 and Block Detection Unit 210.

FIG. 1 demonstrates the embodiment wherein the User Device 102 and Proxy servers 130, 132 are not a part of the Service Provider Infrastructure 104. The User Device 102 can be any device that can connect to a Service Provider Infrastructure 104 through a network, in some cases it does so through the Internet. Such a device can be a computer, a mobile phone, a tablet, or any other electronic device. FIG. 1 shows that Targets 134 and 136, approached via Proxy 130 and Proxy 132 are outside of the Service Provider Infrastructure 104 and are based in any Network 140. In some embodiments the Network 140 is the Internet.

Further demonstrated in FIG. 1 are elements within Service Provider Infrastructure 104, starting with Scraping Agent 106 that accepts and processes the request from the User Device 102. While executing the request, Scraping Agent 106 obtains a suitable proxy from Proxy Rotator 107 and a scraping strategy from Scraping strategy selection unit 108. Responsive to obtaining the response from a target, Scraping Agent 106 communicates with Block Detection Unit 210, submitting the response obtained for analysis and, ultimately, classification with two possible outcomes: "Block", meaning the response contains no valid data and should be processed accordingly, or "Non-block", meaning the response contains proper response data and is suitable for returning to the User Device 102. Coupled with the classification marker is the probability percentile for the classification.

Figure 2:
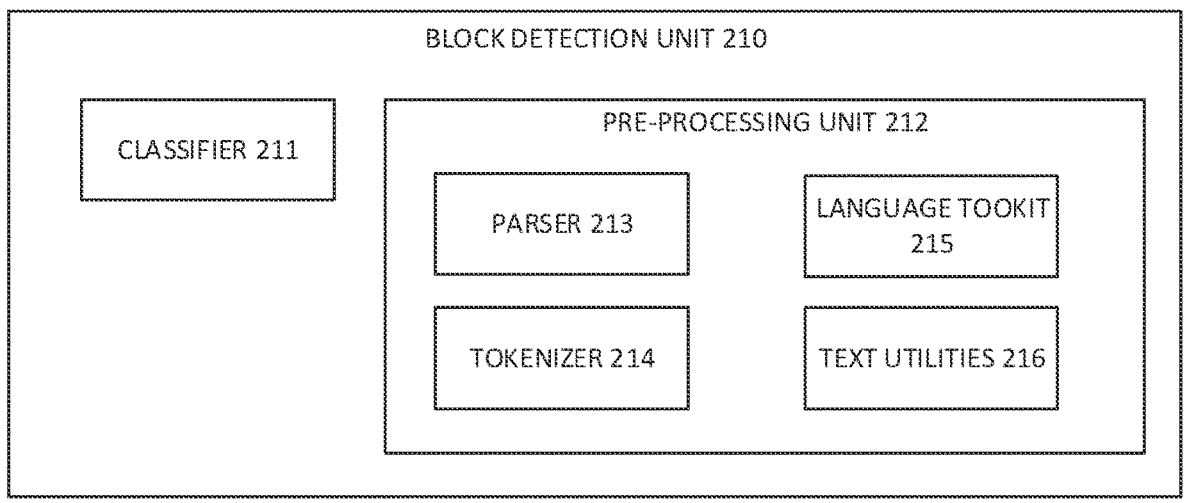
FIG. 2 is a more detailed depiction of the Block Detection Unit component within the overall platform architecture design.

FIG. 2 is a more detailed depiction of Block Detection Unit 210. The components and functionalities contained therein are employed during two operational flows—1) Block detection model training and 2) processing regular scraping responses for classifying them as Blocks or proper content (described in FIG. 4).

Block Detection Unit 210 is the component of the SPI 104 responsible for accepting the calls from the Scraping Agent 106 and evaluating the data within, wherein the data is the content obtained during a scraping request or multiple scraping requests. The evaluation of said data comprises pre-processing the data contained therein, classifying the resultant content either as a block or a content proper, and ultimately returning the resultant classification to the Scraping Agent 106, providing the probability percentile for the classification identified. BDU 210 comprises multiple components that provide the functionalities described.

Classifier 211 is the actual component performing the classification of the data provided by the Scraping Agent 106. The classification employs a Machine Learning Model trained with a training dataset constructed from previously collected multiple scraping responses.

Pre-processing Unit 212 is the container object that comprises all the components and functionalities required for pre-processing data before submitting the data for classification. The toolset contained therein is described in the current embodiments in an exemplary fashion and may be expanded with additional tools adapting to the Classifier 211 input data requirements.

Parser 213 is the element extracting the textual information from a HTML file passed over from the Scraping Agent 106.

Tokenizer 214 is the element within the Pre-processing Unit 212 that converts the corpus of natural language text, obtained during the processing of data collected and submitted for classification by Scraping Agent 106, into a set of elements, or tokens, that constitute a more formal representation of the meanings contained within the text. In the tokenized format, the text is more suited for non-human processing e.g., by computer software.

Language toolkit 215 is a set of utilities responsible for identifying the language of a text, as well as for translating a tokenized corpus of text into a different language.

Text utilities 216 is a set of tools responsible for processing the text in different stages of pre-processing, e.g., removing irrelevant elements of text.

Figure 3:
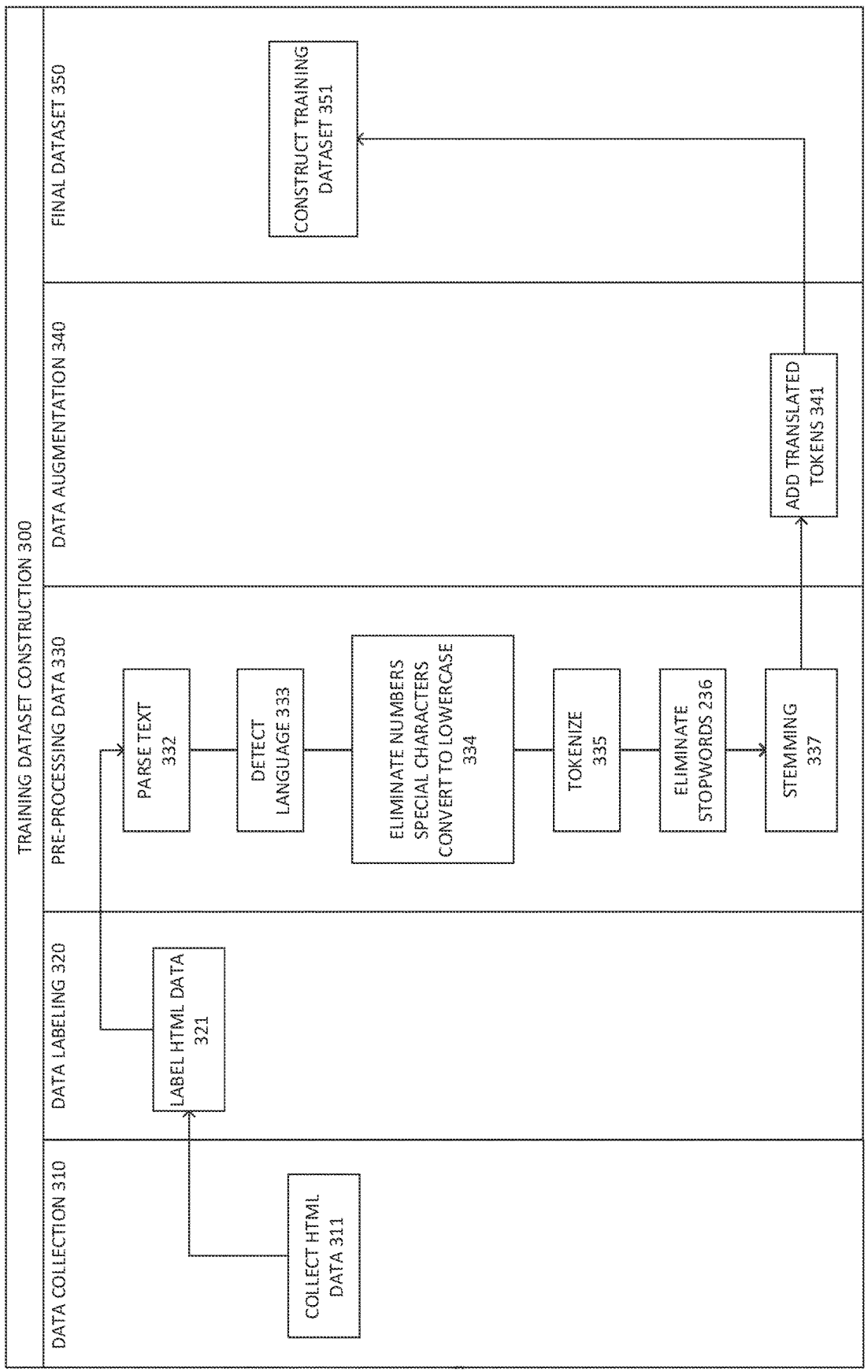
FIG. 3 demonstrates the construction of the Training dataset, a prerequisite for the training of the Block Detection classifier model.

The flow of Training Dataset construction 300 is depicted in FIG. 3, wherein the initial set of HTML Data 311, aggregated from the results of multiple instances of Data Collection 310, is submitted to Data Labeling 320, resulting in the Labeled HTML Data 321. The labeling marks the data as either "Block" or "Not a block".

The resultant data is then submitted to the Pre-processing Data 330 flow, comprising the steps of:

parsing the text within the HTML part of the response at step 332.

detecting the language of the text at step 333.

modifying text elements, e.g., changing all text to lowercase, or eliminating the text that is irrelevant for further processing at step 334, e.g., numbers and special characters.

tokenizing the text at step 335, i.e., breaking a natural language text into a set of elements, otherwise called tokens.

eliminating stop-words at step 336, i.e., the elements of text that are deemed irrelevant for the task at hand and may just introduce additional analysis effort with no benefit.

stemming at step 337, in its basic form—removing the suffixes from words and reducing the words to their root word.

During Data Augmentation 340, the tokenized version of the text is translated, at step 341, into other languages. The main purpose of the data augmentation here is to make the classification model work effectively across different language domains by enriching the resultant Model Training Dataset 351 that the model is trained against, therefore assuring better accuracy of classification. The added benefit of the augmentation is that the data translated is already labeled, i.e. the Model Training Dataset 351 is enriched with labeled data that did not require additional labeling effort. The Final Dataset 350 stage of the processing results in a Training dataset prepared at step 351.

Figure 4:
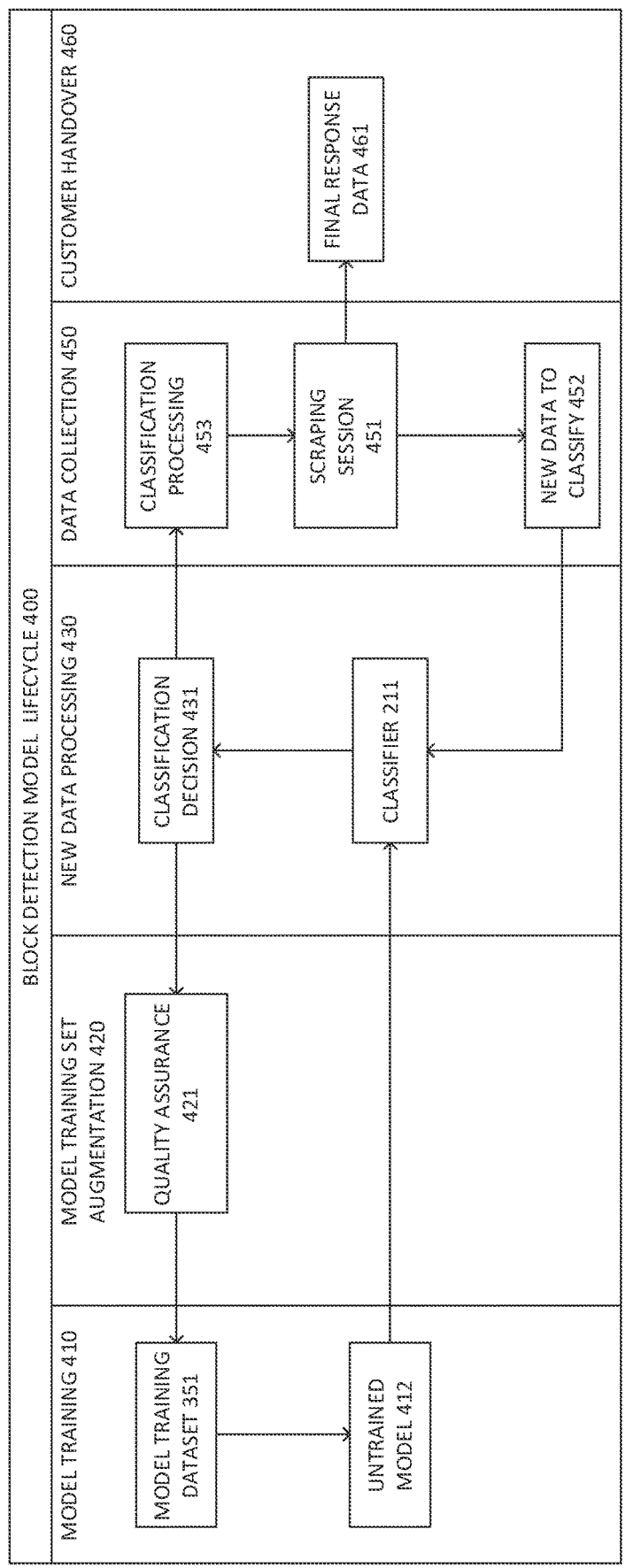
FIG. 4 depicts the lifecycle and the overall functioning of the Block Detection classifier model, starting from the initial training phase, the processing of the actual requests, and the looped feedback model that updates the training dataset with the classification decisions that passed human examination.

FIG. 4 demonstrates the full Block detection model lifecycle 400, starting with the Model Training 410, wherein Training dataset 351 from Training Dataset Construction 300 in FIG. 3 is presented to the untrained Block detection model 412. Upon the training, the model reaches its production stage (Classifier 211), ready to process actual requests to classify New Data to Classify 452. The results of classification—Classification Decision 431—is submitted back to the Data Collection 450 process, where Classification Processing 453 takes place, wherein the results are handed over to Scraping Session 451 with the Final Response Data 461 submitted to the customer.

In another aspect of the embodiment presented herein, an adaptable percentage of the Classification Decision 431 instances may become a part of the Training set, provided the data analyzed and the resultant classification are subjected to Model Training Set Augmentation process 420, wherein their correctness is confirmed during Quality Assurance 421 and they are integrated into the Model Training Dataset 351.

Figure 5A:
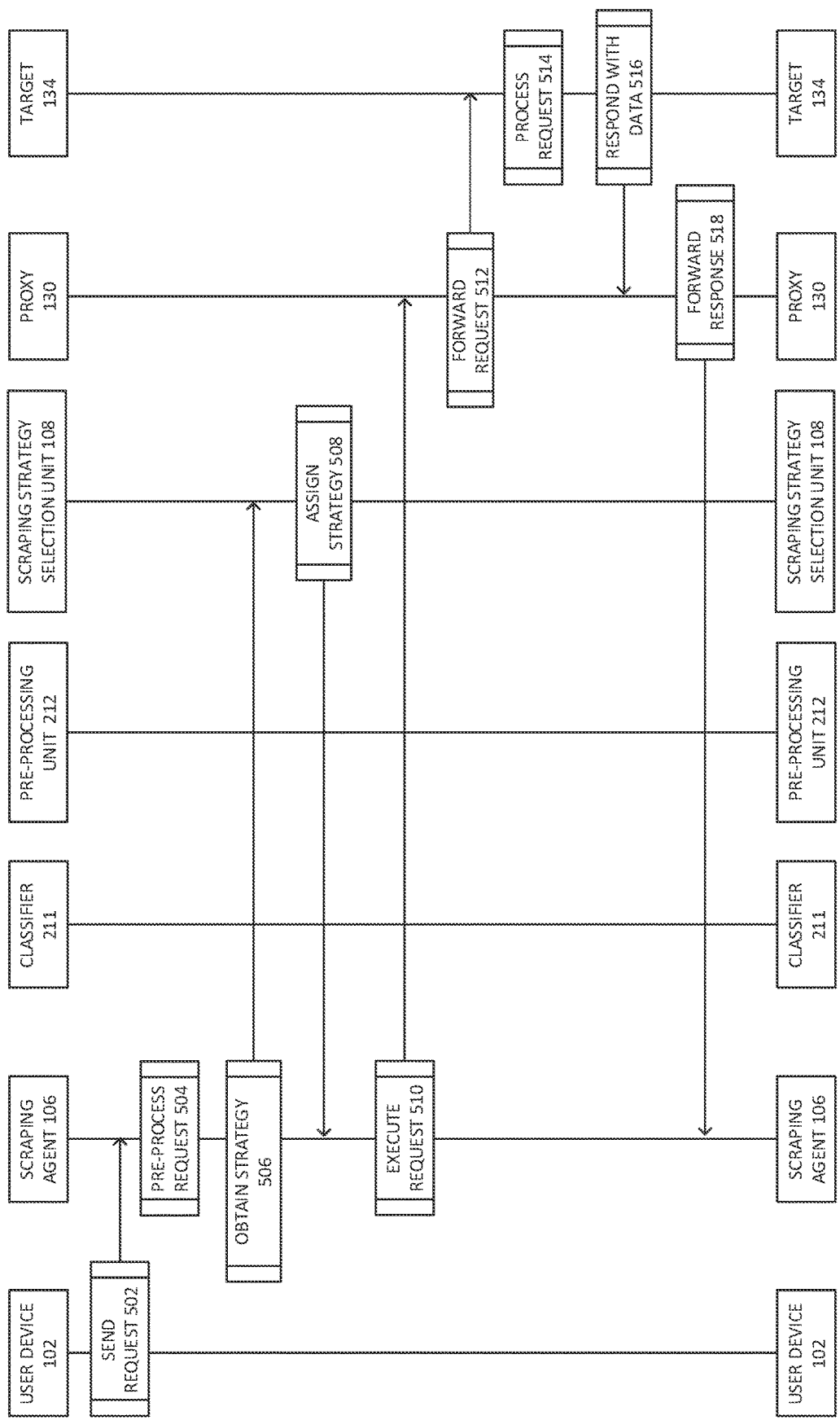
FIG. 5A is an exemplary sequence diagram describing the successful execution of a scraping request, while the response data undergoes block detection analysis and, if deemed a proper content, is handed over to the customer.

FIG. 5A is a sequence diagram, describing the route of a scraping request. The flow starts with a User device 102 submitting a scraping request at step 502, with the Scraping Agent 106 as the entry point to the Service Provider Infrastructure 104, whereas the processing of the request at step 504 may contain the analysis of the request and examination of its parameters for selecting the Scraping strategy, requested by Scraping Agent 106 from Scraping Strategy Selection Unit 108 at step 506 according to the parameters of the scraping request. At step 508, the appropriate Scraping strategy is assigned by SSSU 108. At step 510, the original request is combined with the strategy obtained and further executed through the Proxy 130. The Proxy server 130 in turn submits the request (step 512) to the Target 134. At step 514, Target 134 processes the request and delivers the content requests to the Proxy server 130 at step 516, the content consequently delivered by Proxy server 130 to the Scraping Agent 106 at step 518.

Figure 5B:
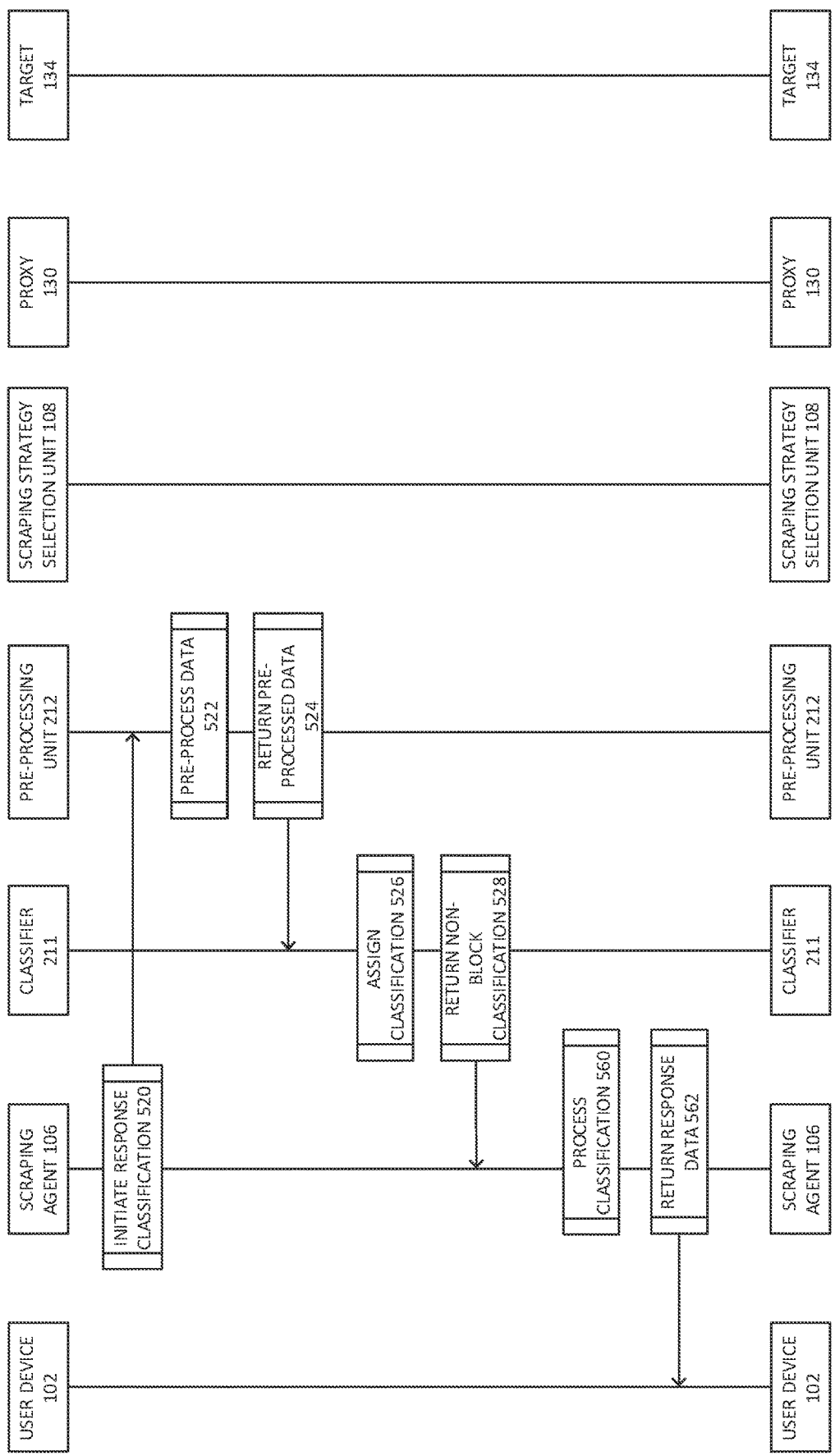
FIG. 5B is a sequence diagram in a continuation of FIG. 5A.

FIG. 5B is the "not a block" continuation flow of the scraping request initiated in FIG. 5A and describes the further communication of the response back to the User Device 102 starting with initiating the Classification of the response data at step 520, where the request for classification is submitted to the BDU 210, namely to the Pre-processing Unit 212. At step 522 the preparing of data for classification takes place, with the steps described in FIG. 3 (steps 332-337). The result of the preparation is handed over to Classifier 211 at step 524, with the actual classification, in this demonstration a Non-block one, produced at step 526 and delivered to Scraping Agent 106 at step 528. Since the response data has been classified as "Not a block" it is further deemed a proper response at step 560 and handed over to the original requesting User Device 102 at step 562.

Figure 5C:
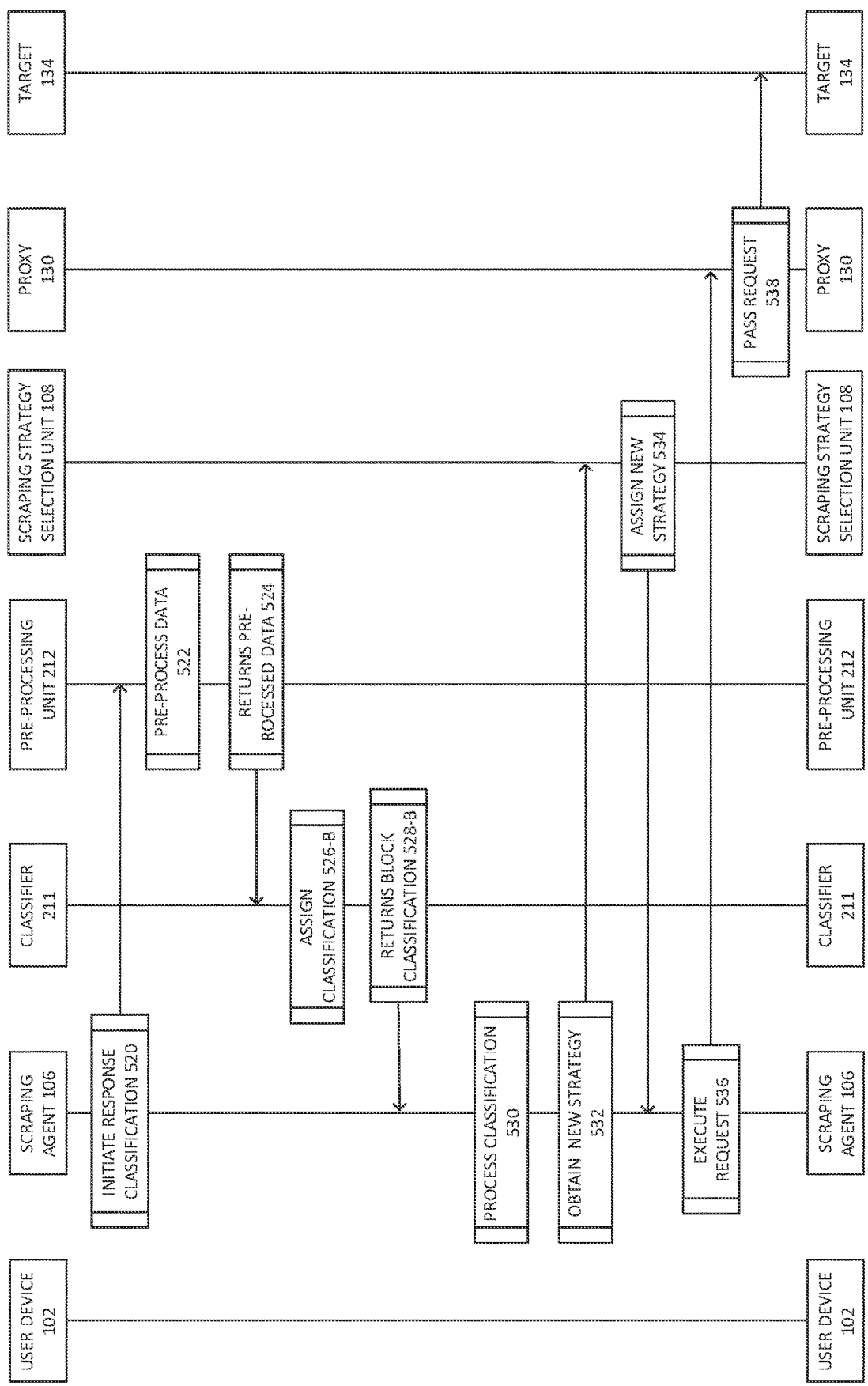
FIG. 5C is an exemplary sequence diagram describing an execution of a scraping request that brings back a response classified as a block.

FIG. 5C is an alternative to FIG. 5B, and describes a "Block" classification use-case. It depicts a continuation flow of the scraping request initiated in FIG. 5A and further describes the communication of the response back to the User Device 102 starting with initiating the Classification of the response data at step 520, where the request for classification is submitted to the BDU 110, namely to the Pre-processing Unit 212. At step 522 the preparing of data for classification takes place, with the steps described in FIG. 3 (steps 332-337). The result of the preparation is handed over to Classifier 211 at step 524, with the actual classification, in this case a Block one, produced at step 526-B and delivered to Scraping Agent 106 at step 528-B, where during the step 530 the Classification decision is processed. Since the classification is a "Block" one, Scraping Agent 106 initiates a repeated attempt to obtain the requested data by first, at step 532, approaching SSSU 108 for a new scraping strategy, obtained at step 534. At the following step 536, the scraping request is communicated by the Scraping Agent 106 to Proxy 130, which in turn forwards the request to Target 134 at step 538.

Figure 5D:
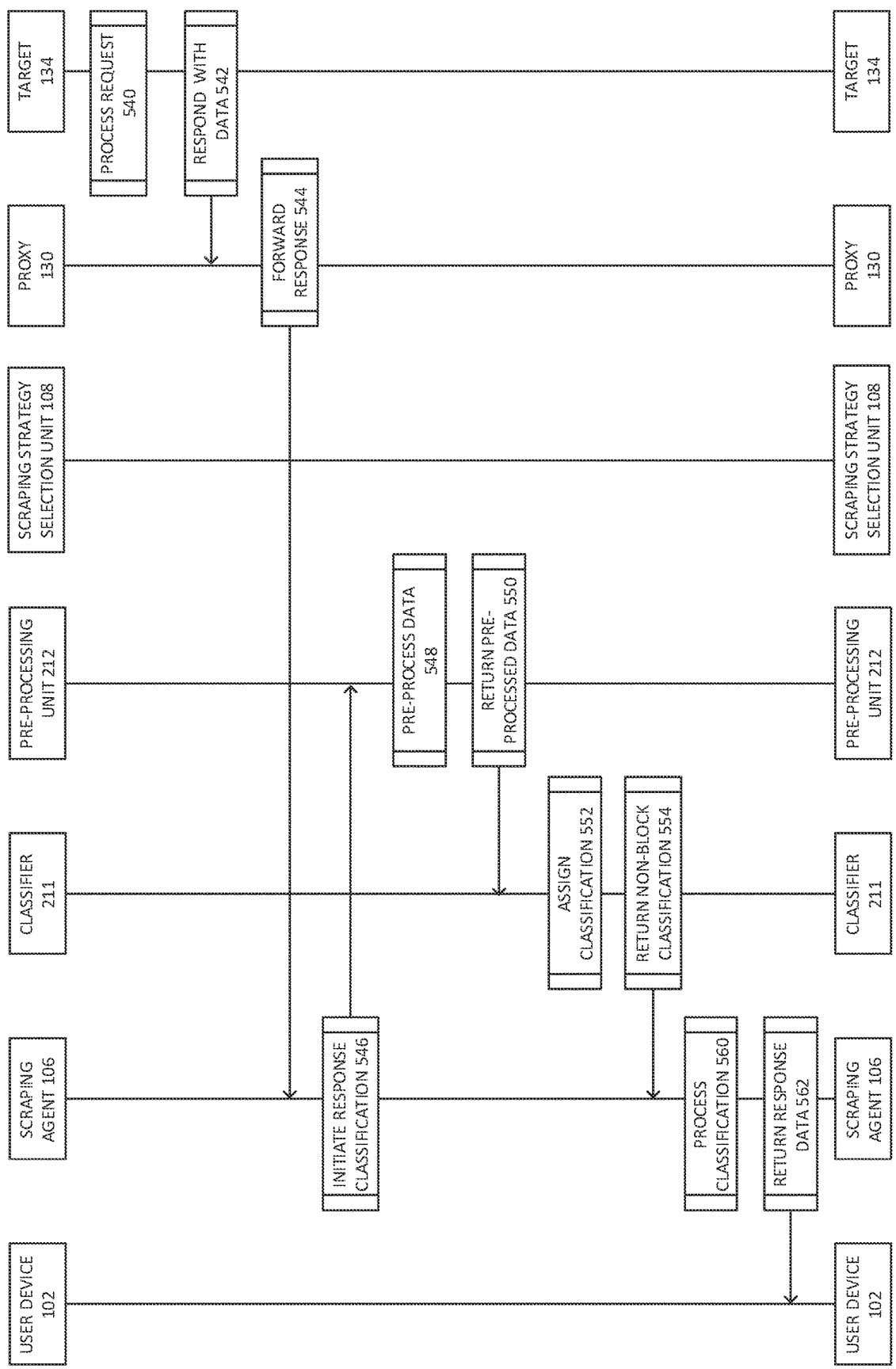
FIG. 5D is a sequence diagram in a continuation of FIG. 5C.

FIG. 5D is the continuation flow of the scraping request described in FIG. 5C. Further described is the processing of the incoming request at the Target 134 at step 540, wherein the response is communicated at step 542 back to the Proxy 130, which in turn forwards the response back to Scraping Agent 106 at step 544. The response is submitted to Pre-processing component 112 for data preparation at step 546, where the response is pre-processed at step 548 and handed over to Classifier 211 at step 550. At step 552, the "not a Block" classification is assigned and communicated back to Scraping Agent 106 at step 554. Since the response data has been classified as Non-block it is further deemed a proper response at step 560 and handed over to the original requesting User Device 102 at step 562.

In an exemplary embodiment a method of processing a data collection response from a network may comprise receiving, at a scraping agent, a Web server's response to a data collection request that originated at a User device 102 and is mediated by a Service Provider infrastructure 104. The response obtained can be subsequently submitted for classification to a Block detection Unit 210, where the response submitted is pre-processed and subjected to the analysis by a Machine Learning-based classification model. As a result, a classification may be assigned to the response and communicated back to the Scraping Agent 106, where the classification is processed and identified, providing for the corresponding routing of the response further.

As one of the potential outcomes of classifying the response within BDU 210 the response is categorized as "not a block" and is handed over to the requesting User Device 102. However if the classification results in the response being identified as "a block" the original request is re-submitted for a repeated data collection attempt.

According to some embodiments the response may be prepared for classification by pre-processing the response in a way that results in all non-essential parts of the original response stripped and may comprise, but is not limited to, the following steps: extracting Hypertext Markup Language (HTML), parsing text within the HTML extracted and tokenizing the text parsed, detecting a language of the text parsed, eliminating low-benefit text elements from the text parsed, eliminating stopwords from the text tokenized, translating tokenized text, if language detection detected multiple language, into the identified primary language or stemming text elements within the tokenized text.

In some of the embodiments the requesting user device may submit preferences as to whether classification functionality is required, via parameters of the request.

In another embodiment the classification model employed may be an implementation of one of the following Machine Learning models—Bag of words, Naïve Bayes algorithm, Support vector machines, Logistic Regression, Random Forest classifier, Extreme Gradient Boosting Model, Convolutional Neural Network or Recurrent Neural Network.

In yet another embodiment a classification decision at a classification platform is submitted for quality assurance wherein the classification assigned is examined and confirmed. The classification decision subjected to quality assurance is categorized as correct and becomes a part of future machine learning classification model training and is incorporated into the corresponding training set.

In certain embodiments the scraping agent employed supports processing non-textual information. Additionally the content delivered within non-textual information may be processed by the classification model.

Some embodiment may include the response being classified as a block. This classification triggers re-submitting of the request as a data collection request, wherein the re-submitting performed at the scraping agent may comprise at least one of the following: acquiring a new scraping strategy at a scraping strategy selection unit, acquiring a new proxy or submitting the request without adjustments.

As defined by another embodiment the response may be verified against a static ruleset before submitting the response for classification, wherein the verification may comprise identifying, in the response, technical protocol errors listed in the static ruleset, and identifying, in the response, HTML elements listed in the static ruleset as witnessing a mangled content. When such verification against the static ruleset detects a block within the response, the response is not submitted for classification and the request is re-submitted as a data collection request. However when such verification against the static ruleset does not detect a block, the response is submitted to the block detection unit for classification. In one potential embodiment the static ruleset can be updated with rules submitted by the requesting user devices along or within the parameters of the data collection request.

Figure 6:
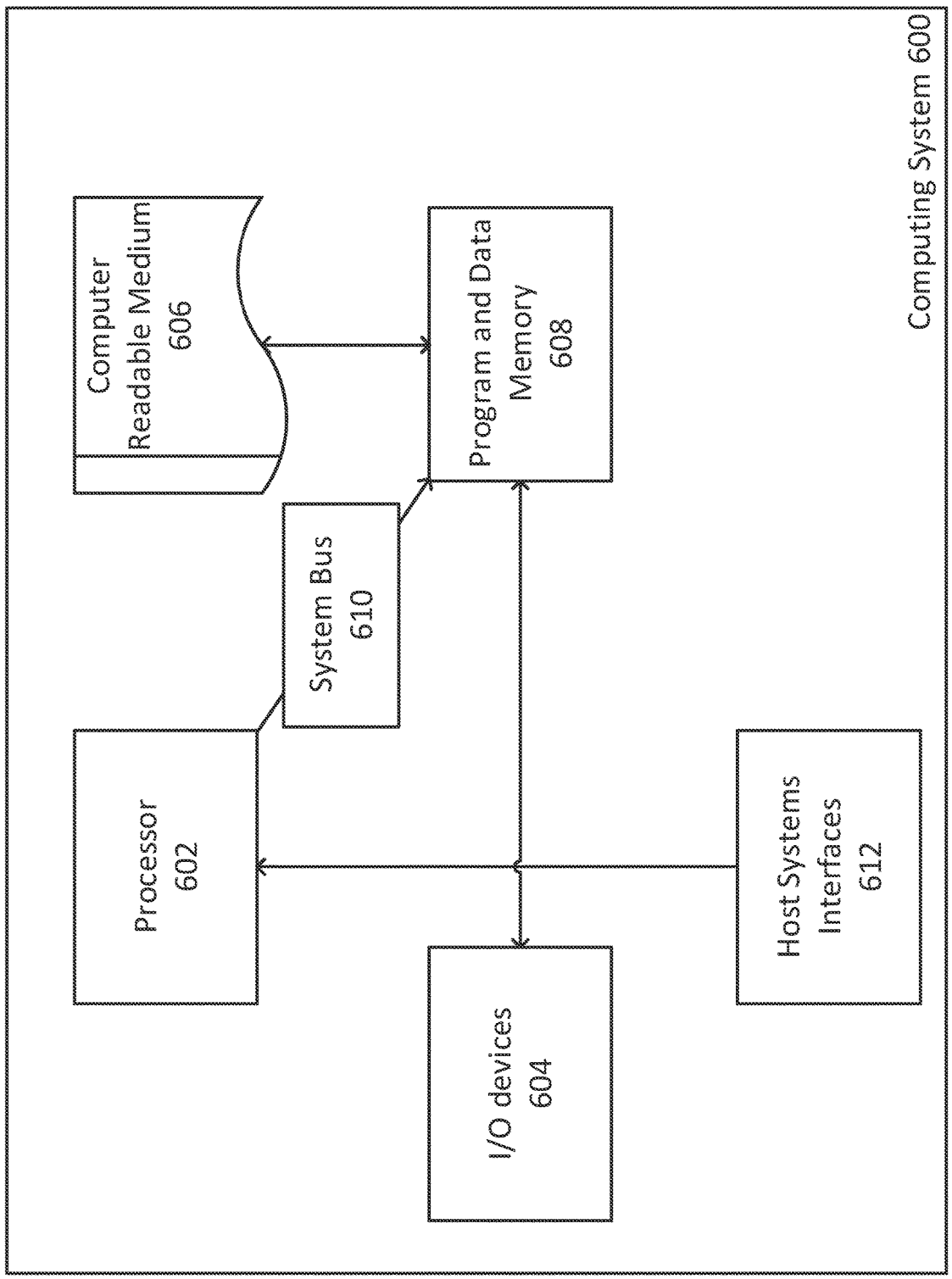
FIG. 6 is an exemplary computing system performing the methods disclosed.

Any of the above embodiments herein may be rearranged and/or combined with other embodiments. Accordingly, the concepts herein are not to be limited to any embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 6 illustrates a computing system 600 in which a computer readable medium 606 may provide instructions for performing any of the methods disclosed herein.

Furthermore, the embodiments can take the form of a computer program product accessible from the computer readable medium 606 providing program code for use by or in connection with a computer or any instruction execution system. For the purposes of this description, the computer readable medium 606 can be any apparatus that can tangibly store the program for use by or in connection with the instruction execution system, apparatus, or device, including the computer system 600.

The medium 606 can be any tangible electronic, magnetic, optical, electromagnetic, infrared, or semiconductor system (or apparatus or device). Examples of a computer readable medium 606 include a semiconductor or solid-state memory, magnetic tape, a removable computer diskette, a random access memory (RAM), NAND flash memory, a read-only memory (ROM), a rigid magnetic disk, and an optical disk. Some examples of optical disks include compact disk-read only memory (CD-ROM), compact disk-read/write (CD-R/W) and digital versatile disc (DVD).

The computing system 600, suitable for storing and/or executing program code, can include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution. Input/output or I/O devices 604 (including but not limited to keyboards, displays, pointing devices, etc.) can be coupled to the system either directly or through intervening I/O controllers. Network adapters may also be coupled to the system to enable the computing system 600 to become coupled to other data processing systems, such as through host systems interfaces 612, or remote printers or storage devices through intervening private or public networks. Modems, cable modems, and Ethernet cards are just a few of the currently available types of network adapters.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential features or elements of any or all the claims. The invention(s) are defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural forms can be used, but it does not limit the scope of the disclosure and the same teaching can apply to multiple objects, even if in the current application an object is referred to in its singular form.

The embodiments detailed herein are provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment in at least some instances. Thus, the following claims are hereby incorporated into the Detailed Description, with each claim standing on its own as separately claimed subject matter.

The invention claimed is:

1. A method of processing a data collection response from a network comprising:
   receiving, at a scraping agent, the data collection response pursuant to sending, to a target, a data collection request originating at a requesting user device; wherein the data collection response is received in Hypertext Markup Language (HTML) format as a HTML response;
   submitting, by the scraping agent to a block detection unit, the HTML response received, for classification;
   preparing HTML response data for classification by pre-processing, at the block detection unit, the response submitted;
   executing, at the block detection unit, a machine learning classification model against the prepared HTML response data;
   assigning, at the block detection unit, the classification of the prepared HTML response data;
   communicating, to the scraping agent, the classification assigned;
   processing the classification assigned at the scraping agent and routing the prepared HTML response according to the classification;
   wherein an outcome of the classification verifies whether the data received from the target is "block" content or "non-block" content.

2. The method of claim 1 wherein when the classification denotes proper content, the response data is routed to the requesting user device.

3. The method of claim 1 wherein when the classification denotes a response containing a block, the data collection request is re-submitted as a subsequent request.

4. The method of claim 1 wherein preparing response data for classification by pre-processing comprises the following steps:
   extracting text blocks of the prepared HTML response;
   parsing text within the HTML response extracted; and,
   tokenizing the text parsed.

5. The method of claim 4 wherein the pre-processing additionally comprises at least one the following steps:
   detecting a language of the text parsed;
   eliminating low-benefit text elements from the text parsed;
   eliminating stopwords from the text tokenized;

translating tokenized text, if language detection detected multiple language, into the identified primary language; or stemming text elements within the tokenized text.

6. The method of claim 1 wherein the requesting user device submits preferences as to whether classification functionality is required, via parameters of the request.

7. The method of claim 1 wherein the Machine Learning model employed is one of the following:

Bag of words;
Naïve Bayes algorithm;
Support vector machines;
Logistic Regression;
Random Forest classifier;
Extreme Gradient Boosting Model;
Convolutional Neural Network; or
Recurrent Neural Network.

8. The method of claim 1 wherein a classification decision at a classification platform is submitted for quality assurance wherein the classification assigned is examined and confirmed.

9. The method of claim 8 wherein the classification decision subjected to quality assurance is categorized as correct and becomes a part of future machine learning classification model training and is incorporated into the corresponding training set.

10. The method of claim 1 wherein content delivered within non-textual information may be processed by the classification model.

11. The method of claim 1 wherein the response classified as a block triggers re-submitting of the request as a data collection request, the re-submitting performed at the scraping agent and comprising at least one of the following:

acquiring a new scraping strategy at a scraping strategy selection unit;

acquiring a new proxy; or submitting the request without adjustments.

12. The method of claim 1 wherein the response is verified against a static ruleset before submitting the response for classification, the verification comprising:

identifying, in the response, technical protocol errors listed in the static ruleset, and identifying, in the response, HTML elements listed in the static ruleset as witnessing a mangled content.

13. The method of claim 12 wherein when verification against the static ruleset detects a block within the response, the response is not submitted for classification and the request is re-submitted as a data collection request.

14. The method of claim 12 wherein when verification against the static ruleset does not detect a block, the response is submitted to the block detection unit for classification.

15. The method of claim 12 where the static ruleset can be updated with rules submitted by the requesting user devices along or within the parameters of the data collection request.

* * * * *